US011493132B2

United States Patent
Syonai

(10) Patent No.: US 11,493,132 B2
(45) Date of Patent: Nov. 8, 2022

(54) SEALING DEVICE

(71) Applicant: NOK CORPORATION, Tokyo (JP)

(72) Inventor: Masaru Syonai, Fukushima (JP)

(73) Assignee: NOK CORPORATION, Tokyo (JP)

( * ) Notice: Subject to any disclaimer, the term of this patent is extended or adjusted under 35 U.S.C. 154(b) by 92 days.

(21) Appl. No.: 17/041,105

(22) PCT Filed: Jun. 25, 2019

(86) PCT No.: PCT/JP2019/025059
§ 371 (c)(1),
(2) Date: Sep. 24, 2020

(87) PCT Pub. No.: WO2020/017249
PCT Pub. Date: Jan. 23, 2020

(65) Prior Publication Data
US 2021/0102628 A1   Apr. 8, 2021

(30) Foreign Application Priority Data
Jul. 17, 2018  (JP) .............................. JP2018-134588

(51) Int. Cl.
*F16J 15/3268*   (2016.01)
*F16J 15/3204*   (2016.01)

(52) U.S. Cl.
CPC ....... *F16J 15/3268* (2013.01); *F16J 15/3204* (2013.01)

(58) Field of Classification Search
CPC ...... F16J 15/00; F16J 15/3268; F16J 15/3272; F16J 15/3276; F16J 15/32; F16J 15/3204; F16J 15/3208; F16J 15/3212
(Continued)

(56) References Cited

U.S. PATENT DOCUMENTS

| 5,727,794 A * | 3/1998 | Fauchon | .............. F16J 15/3268 277/551 |
| 7,506,875 B2 * | 3/2009 | Matsui | ................. F16J 15/3244 277/559 |

(Continued)

FOREIGN PATENT DOCUMENTS

| EP | 1 557 596 | 7/2005 |
| EP | 2 278 196 | 1/2011 |

(Continued)

OTHER PUBLICATIONS

International Search Report issued in International Patent Application No. PCT/JP2019/025059, dated Aug. 13, 2019 and English translation thereof.

(Continued)

*Primary Examiner* — Nathan Cumar
(74) *Attorney, Agent, or Firm* — Greenblum & Bernstein, P.L.C.

(57) ABSTRACT

A sealing device includes a first sealing member and a second sealing member that are mounted on a housing, the outer peripheral surface of the rotational shaft being in slidable contact with the first sealing member and the second sealing member. Distal portions of multiple first hooks formed on the first sealing member are hooked on the distal portions of multiple second hooks formed on the second sealing member for restricting movement of the second sealing member away from the first sealing member in the axial direction of the sealing device. Distal portions of multiple first stoppers formed on the first sealing member are in contact with the distal portions of multiple second stoppers formed on the second sealing member for restricting movement of the second sealing member toward the first sealing member in the axial direction.

7 Claims, 4 Drawing Sheets

(58) Field of Classification Search
USPC .......................................................... 277/572
See application file for complete search history.

(56) References Cited

U.S. PATENT DOCUMENTS

| | | | | |
|---|---|---|---|---|
| 7,775,528 | B2 * | 8/2010 | Berdichevsky | F16J 15/3244 |
| | | | | 277/559 |
| 2012/0313329 | A1 * | 12/2012 | Battles | F16J 15/3232 |
| | | | | 277/565 |

FOREIGN PATENT DOCUMENTS

| | | | | |
|---|---|---|---|---|
| EP | 2278196 A1 * | 1/2011 | ........... | F16J 15/3244 |
| JP | 61-19241 Y2 | 6/1986 | | |
| JP | 62-45469 U | 3/1987 | | |
| JP | 3-11175 U | 2/1991 | | |
| JP | 6-30567 U | 4/1994 | | |
| JP | 2003-83456 A | 3/2003 | | |
| JP | 2014-196796 A | 10/2014 | | |

OTHER PUBLICATIONS

Indonesia Official Action received in Application No. P00202008351, dated Oct. 30, 2021.
Extended European Search Report issued in Application No. 19837054.6, dated Aug. 6, 2021.
Chinese Office Action received in Cn Application No. 201980029419.0, dated Feb. 11, 2022 and English language translation thereof.
Chinese Office Action issued in Chinese Patent Application No. 201980029419.0, dated Aug. 23, 2022.

* cited by examiner

SEALING DEVICE

TECHNICAL FIELD

The present invention relates to sealing devices, each including two sealing members.

BACKGROUND ART

Oil seals for preventing mixing of two kinds of sealed liquids have been developed. Such an oil seal is used, for example, in an automotive vehicle to seal a gap between a rotational shaft, extending from the engine side to the transmission side, and a housing for the rotational shaft, and prevents mixing of engine oil and transmission oil or grease.

For example, Patent Document 1 discloses an assembly having two oil seals. Each oil seal has a mounted part mounted on the housing and a lip on which the outer peripheral surface of the rotational shaft slides. Protrusions are formed on each oil seal, such that the protrusions of one oil seal are engaged with the protrusions of the other oil seal.

BACKGROUND DOCUMENTS

Patent Documents

Patent Document 1: Japanese Utility Model Publication No. 61-19241

SUMMARY OF THE INVENTION

With regard to a sealing device having two sealing members that prevent mixing of two kinds of liquids, it is preferable that the two sealing members can be handled as a single sealing device as an assembly, and that the axial interval between the sealing members can be maintained appropriately.

Accordingly, the present invention provides a sealing device that can be handled as a single sealing device in which two sealing members are combined, and in which the axial interval between the sealing members can be maintained appropriately.

A sealing device according to an aspect of the present invention is a sealing device for sealing a gap between a rotational shaft and a housing for the rotational shaft, and includes: a first sealing member mounted on the housing, an outer peripheral surface of the rotational shaft being in slidable contact with the first sealing member; and a second sealing member mounted on the housing, the outer peripheral surface of the rotational shaft being in slidable contact with the second sealing member. The first sealing member includes multiple first hooks projecting from a surface thereof facing the second sealing member, each first hook including a proximal portion and a distal portion bent from the proximal portion and oriented in a radial direction of the sealing device. The second sealing member includes multiple second hooks projecting from a surface thereof facing the first sealing member, each second hook including a proximal portion and a distal portion bent from the proximal portion and oriented in a radial direction of the sealing device. The distal portion of each second hook are hooked on the distal portion of a first hook for restricting movement of the second sealing member away from the first sealing member in an axial direction of the sealing device. The first sealing member includes multiple first stoppers projecting from the surface thereof facing the second sealing member. The second sealing member includes multiple second stoppers projecting from the surface thereof facing the first sealing member. A distal portion of each second stopper are in contact with a distal portion of a first stopper for restricting movement of the second sealing member toward the first sealing member in the axial direction.

In accordance with this aspect, since the movement toward the direction in which the first sealing member and the second sealing member are separated from each other is restricted by the second hooks being hooked on the first hooks, the first sealing member and the second sealing member are difficult to be separated from each other. Therefore, it is possible to handle the first sealing member and the second sealing member as a single sealing device as an assembly, so that for example, it will be easy to attach the sealing device to a desired position between the rotational shaft and the housing. Furthermore, since the second stoppers are brought into contact with the first stoppers, the movement toward the direction in which the first sealing member and the second sealing member approach each other is restricted, and it is possible to appropriately maintain the interval between the first sealing member (and elements of the first sealing member) and the second sealing member (and elements of the second sealing member) in the axial direction.

Preferably, the first stoppers and the second stoppers are less likely to deform than the first hooks and the second hooks. In this case, the interval between the first sealing member (and elements of the first sealing member) and the second sealing member (and elements of the second sealing member) in the axial direction is unlikely to be affected by the degree of hooking between the first hooks and the second hooks and mainly depends on the degree of deformation of the first stoppers and the second stoppers. Therefore, it is easy to design the interval appropriately.

Preferably, when the distal portions of the second stoppers are in contact with the distal portions of the first stoppers, there are clearances between the first hooks and the second hooks. In this case, the interval between the first sealing member (and elements of the first sealing member) and the second sealing member (and elements of the second sealing member) in the axial direction is unlikely to be affected by the degree of hooking between the first hooks and the second hooks and mainly depends on the degree of deformation of the first stoppers and the second stoppers. Therefore, it is easy to design the interval appropriately.

Preferably, the multiple first hooks are arranged at intervals in a circumferential direction, whereas the multiple first stoppers are arranged at intervals in a circumferential direction, such that clearances between the first hooks do not overlap clearances between the first stoppers in radial directions of the sealing device. In such a sealing device in which the first sealing member and the second sealing member are combined, it is desirable to suppress deformation of elements of the first sealing member and elements of the second sealing member due to change in atmospheric pressure in the space between the first sealing member and the second sealing member. For this reason, it is desirable that air be able to flow out from the space between the first sealing member and the second sealing member to the outside and be able to flow into the space from the outside due to change in atmospheric pressure. However, when air flows into the space from the outside, it is desirable that foreign matter (for example, dust or muddy water) does not reach the sealed part between any one of the sealing members and the rotational shaft. Since the clearances between the first hooks do not overlap the clearances between the first stoppers in radial directions, foreign matter is unlikely to reach the sealed part between any one of the sealing members and the rotational shaft.

Preferably, the multiple second hooks are arranged at intervals in a circumferential direction, whereas the multiple second stoppers are arranged at intervals in a circumferential direction, such that clearances between the second hooks do not overlap with clearances between the second stoppers in radial directions of the sealing device. In this case, since the clearances between the second hooks do not overlap with the clearances between the second stoppers in radial directions of the sealing device, foreign matter is unlikely to reach the sealed part between any one of the sealing members and the rotational shaft.

Preferably, the multiple first hooks are arranged at equiangular intervals in the circumferential direction, whereas the multiple second hooks are arranged at equiangular intervals in the circumferential direction, such that the number of the first hooks and the number of the second hooks are different from each other. In this case, it is unlikely that the clearances between the first hooks overlap with the clearances between the second hooks in the radial directions, and foreign matter is more unlikely to reach the sealed part between any one of the sealing members and the rotational shaft.

DESCRIPTION OF EMBODIMENTS

Hereinafter, with reference to the accompanying drawings, an embodiment according to the present invention will be described. It is noted that the drawings do not necessarily accurately show relative dimensional ratios of actual products according to the embodiments, and certain dimensions may be exaggerated.

Figure 1:
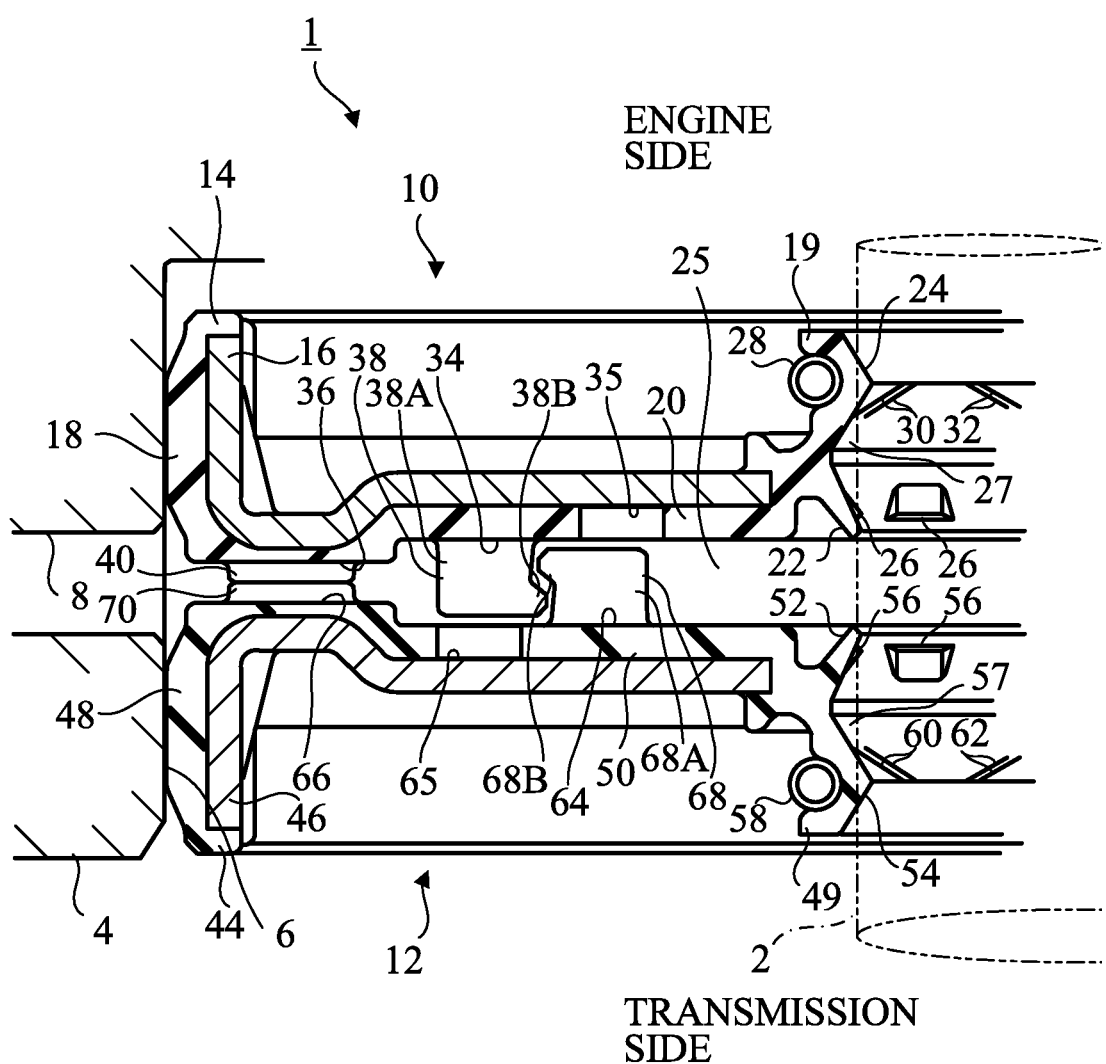
FIG. 1 is a cross-sectional view showing a sealing device according to an embodiment of the present invention.

A sealing device according to the embodiment of the present invention is a two-liquid separation type that prevents mixing of two kinds of liquids. As shown in FIG. 1, a sealing device 1 according to the embodiment of the present invention is used for sealing a gap between a rotational shaft 2 extending from the engine side to the transmission side and a housing 4 for the rotational shaft 2 in an automotive vehicle. Engine oil (liquid) is present on the engine side, whereas transmission oil or grease (liquid) is present on the transmission side. The sealing device 1 prevents mixing of the engine oil and the transmission oil or grease.

The rotational shaft 2 has a cylindrical shape and the sealing device 1 has an annular shape, but only the left side parts of the rotational shaft 2 and the sealing device 1 are shown in FIG. 1.

A shaft hole 6 is formed in the housing 4, and the rotational shaft 2 is disposed inside the shaft hole 6. Furthermore, one or more air passages 8 communicating with the shaft hole 6 are formed in the housing 4.

The sealing device 1 includes an annular first sealing member 10 and an annular second sealing member 12. The first sealing member 10 and the second sealing member 12 are used in combination. The first sealing member 10 and the second sealing member 12 are mounted on the housing 4 in a combined state, so that the outer peripheral surface of the rotational shaft 2 is in slidable contact with the first sealing member 10 and the second sealing member 12. In this embodiment, the first sealing member 10 and the second sealing member 12 have the same outer diameter and the same width (length in the axial direction of the rotational shaft 2).

The first sealing member 10 is located on the engine side and can be called an engine-side sealing member. The second sealing member 12 is located on the transmission side and can be referred to as a transmission-side sealing member.

The first sealing member 10 has a composite structure including an elastic ring 14 and a rigid ring 16. The elastic ring 14 is made of an elastic material such as an elastomer. The rigid ring 16 is made of a rigid material, such as a metal. The rigid ring 16 is in close contact with the elastic ring 14 and reinforces the elastic ring 14.

The first sealing member 10 has an outer cylindrical part 18, an inner cylindrical part 19, and a connecting part 20. The inner cylindrical part 19 is located radially inside the outer cylindrical part 18, whereas the connecting part 20 is a substantially circular plate that connects the outer cylindrical part 18 with the inner cylindrical part 19.

The outer cylindrical part 18 is constituted of a part of the elastic ring 14 and a part of the rigid ring 16 disposed inside thereof. The inner cylindrical part 19 is constituted of a part of the elastic ring 14, whereas the connecting part 20 is constituted of a part of the elastic ring 14 and a part of the rigid ring 16.

The outer cylindrical part 18 is a mounted part that is to be mounted on the housing 4. Although the mounting scheme is not limited, the first sealing member 10 can be fixed to the housing 4, for example, by fitting (press-fitting) the outer cylindrical part 18 into the shaft hole 6.

A dust lip 22 and a seal lip 24 are formed on the inner cylindrical part 19. The dust lip 22 and the seal lip 24 are brought into contact with the outer peripheral surface of the rotational shaft 2 and elastically deformed. However, FIG. 1 shows the contours of the dust lip 22 and the seal lip 24 that are not deformed.

The dust lip 22 is a plate having a truncated cone shape, and the distal end thereof is in contact with the outer peripheral surface of the rotational shaft 2. As the rotational shaft 2 rotates, the outer peripheral surface of the rotational shaft 2 slides on the distal end of the dust lip 22. The dust lip 22 impedes or prevents foreign matter (for example, dust or muddy water) that has passed from the air passage 8 of the housing 4 through a space 25 between the first sealing member 10 and the second sealing member 12 from entering the engine side.

Although not essential, at least one protrusion 26 is formed on the inner surface of the dust lip 22. Preferably, multiple protrusions 26 are formed on the inner surface of the dust lip 22 at, for example, equiangular intervals. When the pressure in a space 27 between the dust lip 22 and the seal lip 24 decreases, and thus, the dust lip 22 is excessively elastically deformed and comes into close contact with the outer peripheral surface of the rotational shaft 2, the protrusions 26 interposed between the dust lip 22 and the outer peripheral surface of rotational shaft 2 create one or more gaps between the dust lip 22 and the rotational shaft 2. As a result, the space 27 and the space 25 are temporarily communicated for eliminating an atmospheric pressure difference that causes the seal lip 24 to be brought into close contact with the outer peripheral surface of the rotational shaft 2. In this way, the protrusions 26 protect the sealing lip 24 from excessive wear.

The seal lip 24 is a protrusion having a triangular cross section having two inclined surfaces, and the distal end thereof is in contact with the outer peripheral surface of the rotational shaft 2. As the rotational shaft 2 rotates, the outer peripheral surface of the rotational shaft 2 slides on the distal end of the seal lip 24. The seal lip 24 suppresses leakage of the engine oil from the engine side to the transmission side.

Although not essential, a garter spring 28 may be wound around the inner cylindrical part 19. The garter spring 28 presses the seal lip 24 inward to increase the contact pressure of the seal lip 24 against the rotational shaft 2.

Although not essential, multiple spiral protrusions 30 and 32 are formed on the inclined surface of the seal lip 24 on the side of the space 27.

The interspace between the protrusions 30 and the interspace between the protrusions 32 serve to return the engine oil from the space 27 to the engine side due to the relative rotation of the shaft 2 and the housing 4. In other words, as the shaft 2 and the housing 4 rotate relative to each other, the interspace between the protrusions 30 and the interspace between the protrusions 32 perform a pumping action that moves the engine oil from the space 27 to the engine side. The protrusions 30 are adapted to the normal rotation direction, and the interspace between the protrusions 30 returns the engine oil from the space 27 to the engine side during the relative normal rotation of the shaft 2 and the housing 4. On the other hand, the protrusions 32 are adapted to the reverse rotation direction opposite to the normal rotation direction, and when the shaft 2 and the housing 4 are rotated in the reverse direction, the interspace between the protrusions 32 returns the engine oil from the space 27 to the engine side.

The connecting part 20 is constituted of a part of the elastic ring 14 and a part of the rigid ring 16. In the connecting part 20, the part of the elastic ring 14 is disposed closer to the second sealing member 12 than the part of the rigid ring 16. One side of the connecting part 20 closer to the second sealing member 12 has two flat surfaces 34 and 36 that are perpendicular to the axial direction of the rotational shaft 2 and are parallel to each other. The flat surfaces 34 and 36 face the second sealing member 12. The radial inner flat surface 34 is farther from the second sealing member 12 than the radially outer flat surface 36. That is, the flat surface 34 is recessed from the flat surface 36.

Figure 2:
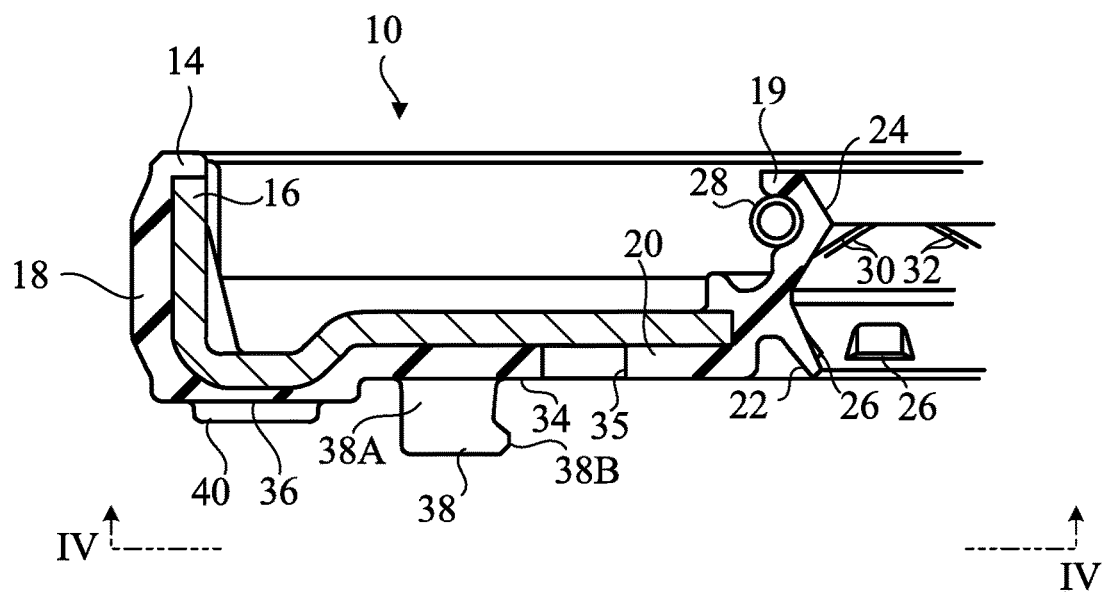
FIG. 2 is a cross-sectional view showing a first sealing member of the sealing device.
Figure 4:
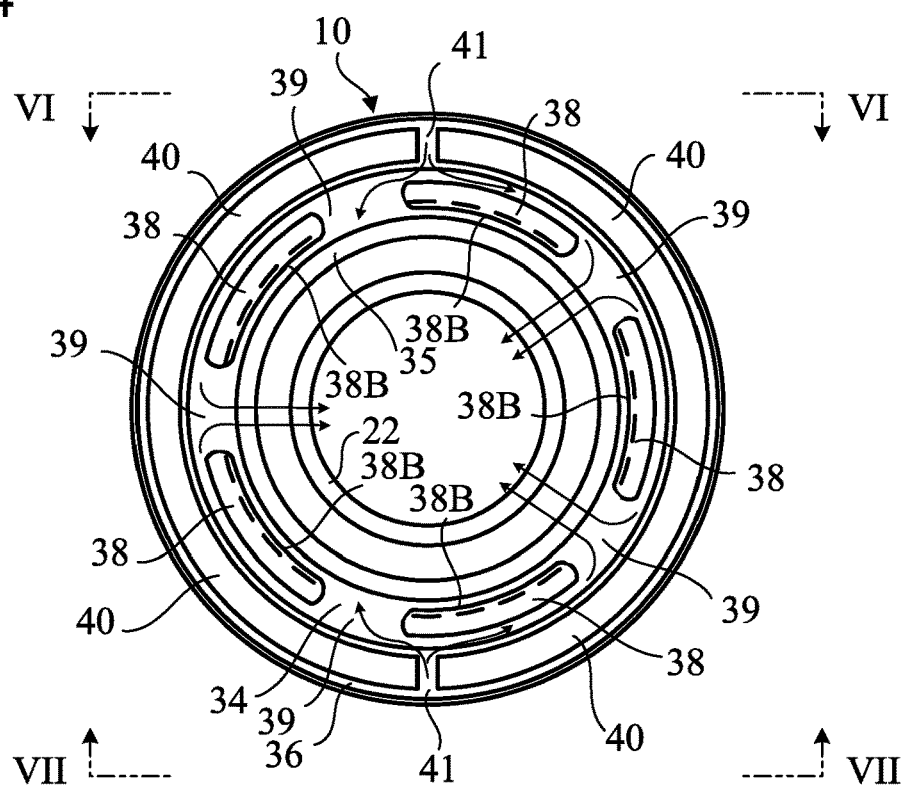
FIG. 4 is a view taken along line IV-IV in FIG. 2.

As shown in FIG. 1, and in FIGS. 2 and 4 showing only the first sealing member 10, multiple first hooks 38 protrude from the flat surface 34 facing the second sealing member 12. Each first hook 38 has a proximal portion 38A protruding from the flat surface 34 and a distal portion 38B bent from the proximal portion 38A and oriented inward in a radial direction. As shown in FIG. 4, the multiple first hooks 38 have an arcuate outline and are arranged on the same circle at equiangular intervals in the circumferential direction. The multiple first hooks 38 have the same shape and the same dimensions as one another. Clearances 39 are provided between adjacent first hooks 38, and portions corresponding to the clearance 39 are flush with the flat surface 34. In this embodiment, five first hooks 38 are formed, and five clearances 39 are provided.

Although not essential, a circular circumferential groove 35 is formed on the flat surface 34. The circumferential groove 35 is located more on the radially inner side than the first hooks 38.

Multiple first stoppers 40 protrude from the flat surface 36 facing the second sealing member 12. Each first stopper 40 is a flat plate, has an arcuate outline, and is arranged on the same circle at equiangular intervals in the circumferential direction. The multiple first stoppers 40 have the same shape and the same dimensions as one another. Clearances 41 are provided between adjacent first stoppers 40, and portions corresponding to the clearances 41 are flush with the flat surface 36. In this embodiment, two first stoppers 40 are formed, and two clearances 41 are provided.

As shown in FIG. 2, the distal portions of the first stoppers 40 are flat surfaces perpendicular to the axial direction of the rotation shaft 2 and parallel to the flat surfaces 34 and 36, and the distal portions of the multiple first stoppers 40 are flush with each other.

As shown in FIG. 1, the second sealing member 12 is of a composite structure having an elastic ring 44 and a rigid ring 46. The elastic ring 44 is made of an elastic material such as an elastomer. The rigid ring 46 is made of a rigid material, such as a metal. The rigid ring 46 is in close contact with the elastic ring 44 and reinforces the elastic ring 44.

The second sealing member 12 has an outer cylindrical part 48, an inner cylindrical part 49, and a connecting part 50. The inner cylindrical part 49 is located radially inside the outer cylindrical part 48, whereas the connecting part 50 is a substantially circular plate, and connects the outer cylindrical part 48 with the inner cylindrical part 49.

The outer cylindrical part 48 is constituted of a part of the elastic ring 44 and a part of the rigid ring 46 disposed inside thereof. The inner cylindrical part 49 is constituted of a part of the elastic ring 44, whereas the connecting part 50 is constituted of a part of the elastic ring 44 and a part of the rigid ring 46.

The outer cylindrical part 48 is a mounted part that is to be mounted on the housing 4. Although the mounting scheme is not limited, the second sealing member 12 can be fixed to the housing 4, for example, by fitting (press-fitting) the outer cylindrical part 48 into the shaft hole 6.

A dust lip 52 and a seal lip 54 are formed on the inner cylindrical part 49. The dust lip 52 and the seal lip 54 are brought into contact with the outer peripheral surface of the rotational shaft 2 and are elastically deformed. However, FIG. 1 shows the contours of the dust lip 52 and seal lip 54 that are not deformed.

The dust lip 52 is a plate having a truncated cone shape, and the distal end thereof is in contact with the outer peripheral surface of the rotational shaft 2. As the rotational shaft 2 rotates, the outer peripheral surface of the rotational shaft 2 slides on the distal end of the dust lip 52. The dust lip 52 impedes or prevents foreign matter that has passed from the air passage 8 of the housing 4 through the space 25 between the first sealing member 10 and the second sealing member 12 from entering the transmission side.

Although not essential, at least one protrusion 56 is formed on the inner surface of the dust lip 52. Preferably, multiple protrusions 56 are formed on the inner surface of the dust lip 52 at, for example, equiangular intervals. When the pressure in a space 57 between the dust lip 52 and the seal lip 54 decreases, and thus, the dust lip 52 is excessively elastically deformed and comes into close contact with the outer peripheral surface of the rotational shaft 2, the protrusions 56 interposed between the dust lip 52 and the outer peripheral surface of the rotational shaft 2 create one or more gaps between the dust lip 52 and the rotational shaft 2. As a result, the space 57 and the space 25 are temporarily communicated for eliminating an atmospheric pressure difference that causes the seal lip 54 to be brought into close contact with the outer peripheral surface of the rotational shaft 2. In this way, the protrusions 56 protect the seal lip 54 from excessive wear.

The seal lip 54 is a protrusion having a triangular cross section having two inclined surfaces, and the distal end thereof is in contact with the outer peripheral surface of the rotational shaft 2. As the rotational shaft 2 rotates, the outer peripheral surface of the rotational shaft 2 slides on the distal end of the seal lip 54. The seal lip 54 suppresses leakage of the transmission oil or grease from the transmission side to the engine side.

Although not essential, a garter spring 58 may be wound around the inner cylindrical part 49. The garter spring 58 presses the seal lip 54 inward to increase the contact pressure of the seal lip 54 against the rotational shaft 2.

Although not essential, multiple spiral protrusions 60 and 62 are formed on the inclined surface of the seal lip 54 on the side of the space 57.

The interspace between the protrusions 60 and the interspace between the protrusions 62 serve to return the transmission oil or grease from the space 57 to the transmission side due to the relative rotation of the shaft 2 and the housing 4. In other words, as the shaft 2 and the housing 4 rotate relative to each other, the interspace between the protrusions 60 and the interspace between the protrusions 62 perform a pumping action that moves the transmission oil or grease from the space 57 to the transmission side. The protrusions 62 are adapted to the normal rotation direction, and the interspace between the protrusions 62 returns the transmission oil or grease from the space 57 to the transmission side during the relative normal rotation of the shaft 2 and the housing 4. On the other hand, the protrusions 60 are adapted to the reverse rotation direction opposite to the normal rotation direction, and when the shaft 2 and the housing 4 are rotated in the reverse direction, the interspace between the protrusions 60 returns the transmission oil or grease from the space 57 to the transmission side.

The connecting part 50 is constituted of a part of the elastic ring 44 and a part of the rigid ring 46. In the connecting part 50, the part of the elastic ring 44 is disposed closer to the first sealing member 10 than the part of the rigid ring 46. One side of the connecting part 50 closer to the first sealing member 10 has two flat surfaces 64 and 66 that are perpendicular to the axial direction of the rotational shaft 2 and are parallel to each other. The flat surfaces 64 and 66 face the first sealing member 10. The radial inner flat surface 64 is farther from the first sealing member 10 than the radially outer flat surface 66. That is, the flat surface 64 is recessed from the flat surface 66.

Figure 3:
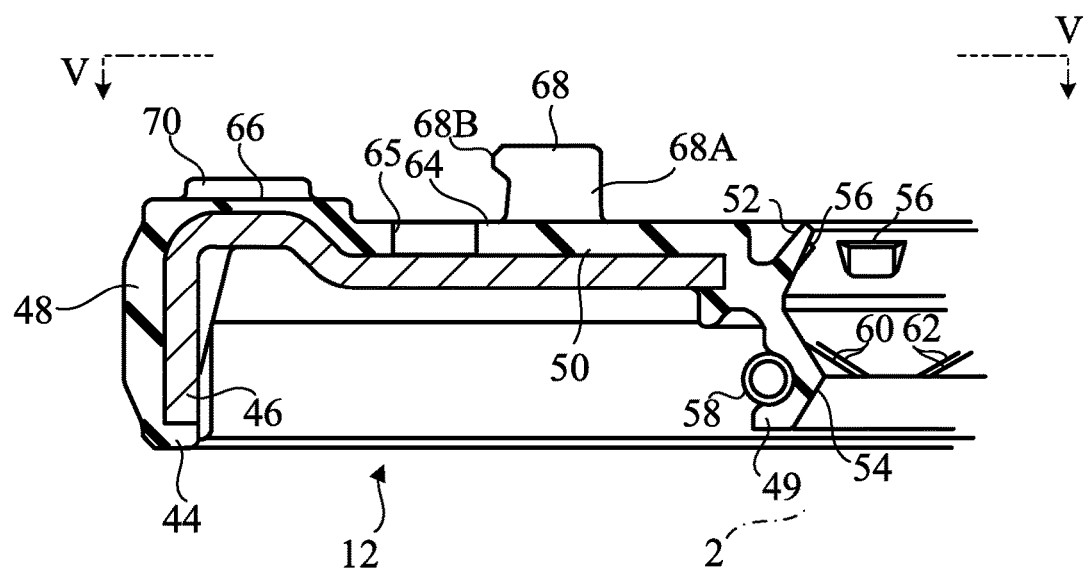
FIG. 3 is a cross-sectional view showing a second sealing member of the sealing device.
Figure 5:
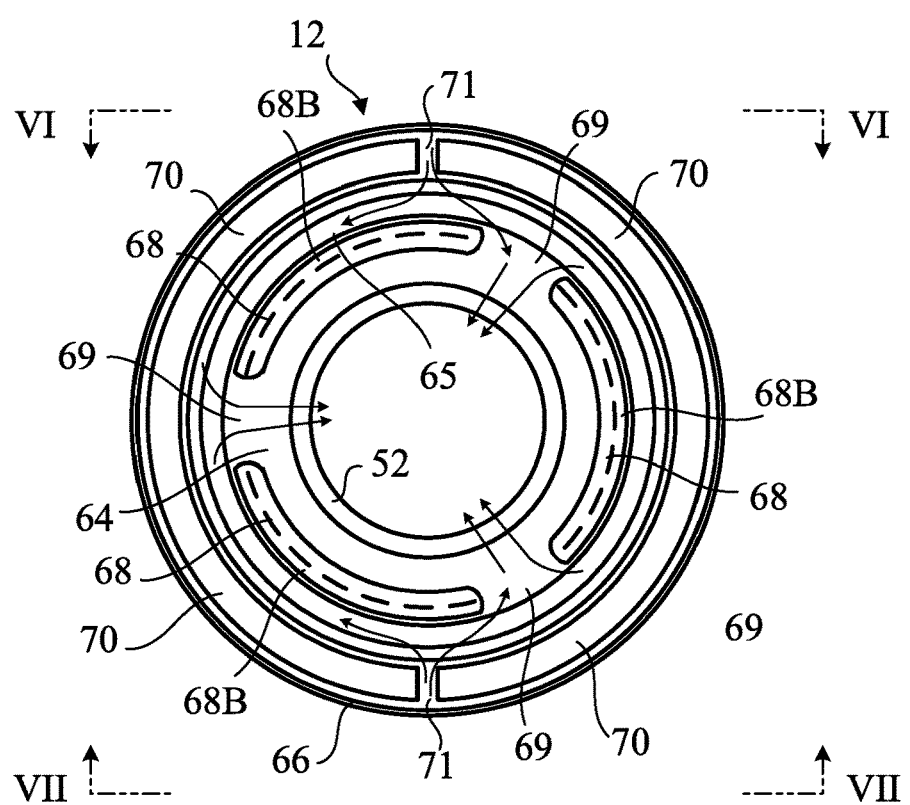
FIG. 5 is a view taken along line V-V in FIG. 2.

As shown in FIG. 1, and in FIGS. 3 and 5 showing only the second sealing member 12, multiple second hooks 68 protrude from the flat surface 64 facing the first sealing member 10. Each second hook 68 has a proximal portion 68A protruding from the flat surface 64 and a distal portion 68B bent from the proximal portion 68A and oriented outward in a radial direction. As shown in FIG. 5, the multiple second hooks 68 have an arcuate outline and are arranged on the same circle at equiangular intervals in the circumferential direction. The multiple second hooks 68 have the same shape and the same dimensions as one another. Clearances 69 are provided between adjacent second hooks 68, and portions corresponding to the clearances 69 are flush with the flat surface 64. In this embodiment, three second hooks 68 are formed, and three clearances 69 are provided.

Although not essential, a circular circumferential groove 65 is formed on the flat surface 64. The circumferential groove 65 is located more on the radially outer side than the second hooks 68.

Multiple second stoppers 70 protrude from the flat surface 66 facing the first sealing member 10. Each second stopper 70 is a flat plate, has an arcuate outline, and is arranged on the same circle at equiangular intervals in the circumferential direction. The multiple second stoppers 70 have the same shape and the same dimensions as one another. Clearances 71 are provided between adjacent second stoppers 70, and portions corresponding to the clearances 71 are flush with the flat surface 66. In this embodiment, two second stoppers 70 are formed, and two clearances 71 are provided.

As shown in FIG. 3, the distal portions of each of the second stoppers 70 are flat surfaces perpendicular to the axial direction of the rotation shaft 2 and parallel to the flat surfaces 64 and 66, and the distal portions of the multiple second stoppers 70 are flush with each other.

As shown in FIG. 1, the distal portions 68B of the second hooks 68 are hooked on the distal portions 38B of the first hook 38, thereby restricting the movement toward the direction in which the first sealing member 10 and the second sealing member 12 are separated from each other. Thus, once the first sealing member 10 and the second sealing member 12 are combined with each other, the first sealing member 10 and the second sealing member 12 are difficult to separate from each other. Therefore, it is possible to handle the first sealing member 10 and the second sealing member 12 as a single sealing device 1 as an assembly, so that, for example, it is easy to attach the sealing device 1 to a desired position between the rotational shaft 2 and the housing 4. For example, the step of press-fitting the outer cylindrical part 18 into the shaft hole 6 and the step of press-fitting the outer cylindrical part 48 into the shaft hole 6 can be performed in one step. Since the hooks 38 and 68 are made of an elastic material, they can be easily hooked on each other.

Furthermore, the flat distal portions of the multiple second stoppers 70 are brought into contact with the flat distal portions of the multiple first stoppers 40, thereby restricting the movement toward the direction in which the first sealing member 10 and the second sealing member 12 approach each other. It is possible to appropriately maintain the interval between the first sealing member 10 (and the dust lip 22 and the seal lip 24 that are elements of the first sealing member 10) and the second sealing member 12 (and the dust lip 52 and the sealing lip 54 that are elements of the second sealing member 12) in the axial direction of the sealing device 1. In other words, the stoppers 40 and 70 are used as positioning means for the first sealing member 10 and the second sealing member 12 relative to each other.

In this embodiment, the first stoppers 40 and the second stoppers 70 are less likely to deform than the first hooks 38 and the second hooks 68. Specifically, the width of each of the stoppers 40 and 70 (length in radial directions of the sealing device 1) is greater than the width of each of the proximal portions 38A and 68A of the hooks 38 and 68 (length in radial directions of the sealing device 1). The length of each of the stoppers 40 and 70 in the circumferential direction is also greater than the length of each of the hooks 38 and 68. Furthermore, the height of each of the stoppers 40 and 70 (length in the axial direction of the sealing device 1) is less than the height of each of the hooks 38 and 68 (length in the axial direction of the sealing device 1).

Since the stoppers 40 and 70 are less likely to deform than the hooks 38 and 68, the interval between the first sealing member 10 (and elements of the first sealing member 10) and the second sealing member 12 (and elements of the second sealing member 12) in the axial direction is unlikely to be affected by the degree of hooking between the first hooks 38 and the second hooks 68 and mainly depends on the degree of deformation of the first stoppers 40 and the second stoppers 70. Therefore, it is easy to design the interval between the sealing members 10 and 12 appropriately.

In this embodiment, as shown in FIG. 1, when the distal portions of the second stoppers 70 are in contact with the distal portions of the first stoppers 40, there are clearances between the first hooks 38 and the second hooks 68, between each first hook 38 and the flat surface 64 of the second sealing member 12, and between each second hook 68 and the flat surface 34 of the first sealing member 10. In other words, when the distal portions of the second stoppers 70 are in contact with the distal portions of the first stoppers 40, the first hooks 38 are not in contact with the second sealing member 12, and the second hook 68 are not also in contact with the first sealing member 10.

Thus, the interval between the first sealing member 10 (and elements of the first sealing member 10) and the second sealing member 12 (and elements of the second sealing member 12) in the axial direction is unlikely to be affected by the degree of hooking between the first hooks 38 and the second hooks 68 and mainly depends on the degree of deformation of the first stoppers 40 and the second stoppers 70. Therefore, it is easy to design the interval between the sealing members 10 and 12 appropriately.

In such a sealing device 1 in which the sealing members 10 and 12 are combined, it is desirable to suppress deformation of elements of the first sealing member 10 (the dust lip 22 and the seal lip 24) and elements of the second sealing member 12 (the dust lip 52 and the seal lip 54) due to change in atmospheric pressure in the space 25 between the sealing members 10 and 12. For this reason, it is desirable that air be able to flow out from the space 25 to the outside and be able to flow into the space 25 from the outside due to change in atmospheric pressure in the space 25. For this purpose, one or more air passages 8, which communicate with the space 25, are formed in the housing 4.

However, when air flows into the space 25 from the outside and advances radially inward, it is desirable that foreign matter not reach the sealed part between any one of the sealing members 10 and 12 and the rotational shaft 2. This is because if foreign matter intrudes between any one of the lips and the rotational shaft 2, it is likely that sealed liquid may leak out.

Accordingly, as shown in FIG. 4, in the first sealing member 10, the clearances 39 between the first hooks 38 are arranged such that the clearances 39 do not overlap with the clearance 41 between the first stoppers 40 in radial directions, so that foreign matter is unlikely to reach the sealed part between any one of the sealing members 10 and 12 and the rotational shaft 2. In addition, as shown in FIG. 5, in the second sealing member 12, the clearances 69 between the second hooks 68 are arranged such that the clearances 69 do not overlap with the clearances 71 between the second stoppers 70 in radial directions, so that foreign matter is unlikely to reach the sealed part between any one of the sealing members 10 and 12 and the rotational shaft 2.

In FIGS. 4 and 5, multiple arrows schematically indicate paths through which inflow air from the air passage 8 travels radially inward. As shown in the figures, bent paths produced by the hooks and the stoppers are provided. It will be understood that foreign matter is unlikely to reach the sealed part between any one of the sealing members 10 and 12 and the rotational shaft 2.

In this embodiment, the number of the first hooks 38 and the number of the second hooks 68 are different. The number of the first hooks 38 is five, whereas the number of the second hooks 68 is three. Therefore, it is unlikely that the clearances 39 between the first hooks 38 overlap with the clearances 69 between the second hooks 68 in the radial directions, and foreign matter is more unlikely to reach the sealed part between any one of the sealing members 10 and 12 and the rotational shaft 2.

Figure 6:
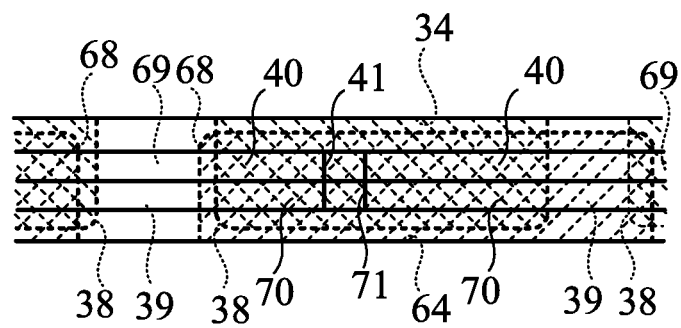
FIG. 6 is a view taken along line VI-VI in FIGS. 4 and 5 showing a part of the sealing device.
Figure 7:
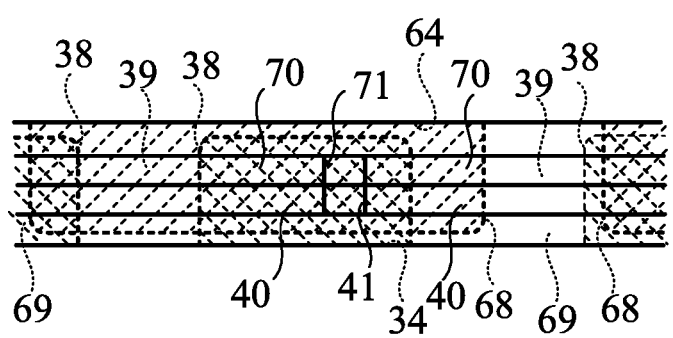
FIG. 7 is a view taken along arrows VII-VII in FIGS. 4 and 5 showing a part of the sealing device.

FIG. 6 is a view of the combined sealing members 10 and 12 taken along line VI-VI in FIGS. 4 and 5. FIG. 7 is a view of the combined sealing members 10 and 12 taken along line VII-VII in FIGS. 4 and 5. In FIGS. 6 and 7, the oblique lines extending from the upper left to the lower right represent the areas of the first hooks 38, whereas the oblique lines extending from the upper right to the lower left represent the areas of the second hooks 68.

As shown in FIGS. 6 and 7, there is a region where the clearance 39 between the first hooks 38 overlaps with the clearance 69 between the second hooks 68 (region without hatching), but there are also regions where the clearances 39 between the first hooks 38 do not overlap with the clearances 69 between the second hooks 68 (regions having only one type of diagonal lines). Thus, since the number of the first hooks 38 arranged at equiangular intervals is different from the number of the second hooks 68 arranged at equiangular intervals, the possibility that the clearances 39 overlap with the clearances 69 in radial directions is low.

Although an embodiment of the present invention has been described, the foregoing description is not intended to limit the present invention, and various modifications including omission, addition, and substitution of structural elements may be made within the scope of the present invention.

For example, in the above-described embodiment, the dust lips 22 and 52 are provided on the sealing members 10 and 12, respectively, but the dust lips 22 and 52 are not absolutely necessary.

In the above-described embodiment, the first sealing member 10 and the second sealing member 12 have the same outer diameter and the same width, and have the same lips 22, 52, 24, and 54. However, the first sealing member 10 and the second sealing member 12 may have different dimensions and may have lips of different sizes.

In the above-described embodiment, the first hooks 38 of the first sealing member 10 are located radially outside the second hook 68 of the second sealing member 12, but the first hook 38 may be located radially inside the second hooks 68.

In the above-described embodiment, the first sealing member 10 is disposed on the engine side and the second sealing member 12 is disposed on the transmission side, but the reverse arrangement may be employed.

In the above-described embodiment, the number of the first hooks 38 is five, whereas the number of the second hooks 68 is three. However, the number of the first hooks 38 is not limited, and the number of the second hooks 68 is not limited. The number of first hooks 38 may be the same as the number of second hooks 68.

In the above-described embodiment, the number of the first stoppers 40 is two, whereas the number of the second stoppers 70 is also two. However, the number of the first stoppers 40 is not limited, and the number of the second stoppers 70 is not limited. The number of first stoppers 40 may be the same as the number of first hooks 38. The number of second stoppers 70 may also be the same as the number of second hooks 68.

In the above-described embodiment, the first hooks 38 are arranged at equiangular intervals, and the second hooks 68 are arranged at equiangular intervals. The first stoppers 40 are arranged at equiangular intervals, and the second stoppers 70 are arranged at equiangular intervals. However, they do not necessarily have to be arranged at equiangular intervals. It is also possible to prevent the clearances 39 from overlapping the clearances 69 at all by changing the numbers and intervals of the hooks.

In the above-described embodiment, the flat distal portions of the multiple first stoppers 40 are flush with each other, whereas the flat distal portions of the multiple second stoppers 70 are flush with each other. However, the flat distal portions of the multiple first stoppers 40 may have a step, and the flat distal portions of the multiple second stoppers 70 may also have a step. The distal portions of the stoppers 40 and 70 may be inclined surfaces.

In the above-described embodiment, the sealing device 1 is used for sealing a gap between the rotational shaft 2 extending from the engine side to the transmission side and the housing 4 for the rotational shaft 2 in an automotive vehicle, for preventing mixing of the engine oil with the transmission oil or grease. However, the use of the sealing device according to the present invention is not limited to the embodiment, and the sealing device according to the present invention may be widely used in order to prevent mixing of two kinds of sealed liquids. For example, the sealing device according to the present invention may be used for the purpose of preventing mixing of water and oil.

REFERENCE SYMBOLS

1: Sealing Device
2: Rotational Shaft
4: Housing
6: Shaft Hole
8: Air Passage
10: First Sealing Member
12: Second Sealing Member
14, 44: Elastic Ring
16, 46: Rigid Ring
22, 52: Dust Lip
24, 54: Seal Lip
25: Space
27, 57: Space
34, 36, 64, 66: Flat Surface
38: First Hook
68: Second Hook
38A, 68A: Proximal Portion
38B, 68B: Distal Portion
39, 69: Clearance
40: First Stopper
70: Second Stopper
41, 71: Clearance

The invention claimed is:

1. A sealing device for sealing a gap between a rotational shaft and a housing for the rotational shaft, including:

a first sealing member mounted on the housing, an outer peripheral surface of the rotational shaft being in slidable contact with the first sealing member; and a second sealing member mounted on the housing, the outer peripheral surface of the rotational shaft being in slidable contact with the second sealing member, the first sealing member comprising multiple first hooks projecting from a surface thereof facing the second sealing member, each first hook comprising a proximal portion and a distal portion bent from the proximal portion and oriented in a radial direction of the sealing device, the second sealing member comprising multiple second hooks projecting from a surface thereof facing the first sealing member, each second hook comprising a proximal portion and a distal portion bent from the proximal portion and oriented in a radial direction of the sealing device, the distal portion of each second hook being hooked on the distal portion of a corresponding first hook for restricting movement of the second sealing member away from the first sealing member in an axial direction of the sealing device, the first sealing member comprising multiple first stoppers projecting from the surface thereof facing the second sealing member, the second sealing member comprising multiple second stoppers projecting from the surface thereof facing the first sealing member, a distal portion of each second stopper being in contact with a distal portion of a corresponding first stopper for restricting movement of the second sealing member toward the first sealing member in the axial direction, wherein the first stoppers and the second stoppers are less likely to deform than the first hooks and the second hooks.

2. The sealing device according to claim 1, wherein when the distal portions of the second stoppers are in contact with the distal portions of the first stoppers, there are clearances between the first hooks and the second hooks in such a manner that the first hooks are not in contact with the second sealing member, and the second hooks are not in contact with the first sealing member.

3. The sealing device according to claim 1, wherein each of the first stoppers and the second stoppers has a first length in radial directions of the sealing device, each of the proximal portions of the first hooks and each of the proximal portions of the second hooks having a second length in radial directions of the sealing device, the first length being greater than the second length, each of the first stoppers and the second stoppers having a third length in a circumferential direction of the sealing device, each of the first hooks and the second hooks having a fourth length in a circumferential direction, the third length being greater than the fourth length, each of the first stoppers and the second stoppers having a fifth length in the axial direction, each of the first hooks and the second hooks having a sixth length in the axial direction, the fifth length being less than the sixth length.

4. A sealing device for sealing a gap between a rotational shaft and a housing for the rotational shaft, including:

a first sealing member mounted on the housing, an outer peripheral surface of the rotational shaft being in slidable contact with the first sealing member; and a second sealing member mounted on the housing, the outer peripheral surface of the rotational shaft being in slidable contact with the second sealing member, the first sealing member comprising multiple first hooks projecting from a surface thereof facing the second sealing member, each first hook comprising a proximal portion and a distal portion bent from the proximal portion and oriented in a radial direction of the sealing device, the second sealing member comprising multiple second hooks projecting from a surface thereof facing the first sealing member, each second hook comprising a proximal portion and a distal portion bent from the proximal portion and oriented in a radial direction of the sealing device, the distal portion of each second hook being hooked on the distal portion of a corresponding first hook for restricting movement of the second sealing member away from the first sealing member in an axial direction of the sealing device, the first sealing member comprising multiple first stoppers projecting from the surface thereof facing the second sealing member, the second sealing member comprising multiple second stoppers projecting from the surface thereof facing the first sealing member, a distal portion of each second stopper being in contact with a distal portion of a corresponding first stopper for restricting movement of the second sealing member toward the first sealing member in the axial direction, wherein the multiple first hooks are arranged at intervals in a circumferential direction, the multiple first stoppers being arranged at intervals in a circumferential direction, and clearances between the first hooks not overlapping with clearances between the first stoppers in radial directions of the sealing device.

5. The sealing device according to claim 4, wherein the multiple first hooks are arranged at equiangular intervals in the circumferential direction, the multiple second hooks being arranged at equiangular intervals in the circumferential direction, the number of the first hooks and the number of the second hooks being different from each other.

6. A sealing device for sealing a gap between a rotational shaft and a housing for the rotational shaft, including:

a first sealing member mounted on the housing, an outer peripheral surface of the rotational shaft being in slidable contact with the first sealing member, and a second sealing member mounted on the housing, the outer peripheral surface of the rotational shaft being in slidable contact with the second sealing member, the first sealing member comprising multiple first hooks projecting from a surface thereof facing the second sealing member, each first hook comprising a proximal portion and a distal portion bent from the proximal portion and oriented in a radial direction of the sealing device, the second sealing member comprising multiple second hooks projecting from a surface thereof facing the first sealing member, each second hook comprising a proximal portion and a distal portion bent from the proximal portion and oriented in a radial direction of the sealing device, the distal portion of each second hook being hooked on the distal portion of a corresponding first hook for restricting movement of the second sealing member away from the first sealing member in an axial direction of the sealing device, the first sealing member comprising multiple first stoppers projecting from the surface thereof facing the second sealing member, the second sealing member comprising multiple second stoppers projecting from the surface thereof facing the first sealing member, a distal portion of each second stopper being in contact with a distal portion of a corresponding first stopper for restricting movement of the second sealing member toward the first sealing member in the axial direction, wherein the multiple second hooks are arranged at intervals in a circumferential direction, the multiple second stoppers being arranged at intervals in a circumferential direction, and clearances between the second hooks not overlapping with clearances between the second stoppers in radial directions of the sealing device.

7. The sealing device according to claim 6, wherein the multiple first hooks are arranged at equiangular intervals in the circumferential direction, the multiple second hooks being arranged at equiangular intervals in the circumferential direction, the number of the first hooks and the number of the second hooks being different from each other.

* * * * *